United States Patent
Grogler et al.

[15] 3,666,726
[45] May 30, 1972

[54] POLYMERS WHICH CONTAIN POLYAMIDE, UREA AND/OR URETHANE GROUPS AND PROCESS FOR PREPARING SAME

[72] Inventors: Gerhard Grogler, Leverkusen; Gunter Oertel, Cologne, both of Germany

[73] Assignee: Farbenfabriken Bayer Aktiengesellschaft, Leverkusen, Germany

[22] Filed: July 2, 1970

[21] Appl. No.: 52,066

[30] Foreign Application Priority Data

July 12, 1969 Germany.....................P 19 35 485.9

[52] U.S. Cl.........260/77.5 CH, 260/77.5 AP, 260/77.5 AM, 260/77.5 R, 260/77.5 CR
[51] Int. Cl. ....................................C08g 22/02, C08g 22/04
[58] Field of Search...........260/77.5 AP, 77.5 AM, 77.5 CH, 260/2.5 AM, 77.5 R, 482 B, 77.5 CR

[56] References Cited

OTHER PUBLICATIONS

Saunders, et al., Polyurethane, Part I, Interscience, N.Y., 1963, pp. 84 & 85

*Primary Examiner*—Donald E. Czaja
*Assistant Examiner*—M. J. Welsh
*Attorney*—Plumley & Tyner

[57] ABSTRACT

Polymers containing polyamide, urea and/or urethane groups are obtained by a process which comprises the polyaddition of aliphatic or aromatic polyisocyanates with polyfunctional aminocrotonic acid esters, the substitutents of which on the nitrogen containing additional hydroxyl or amino groups.

8 Claims, No Drawings

POLYMERS WHICH CONTAIN POLYAMIDE, UREA AND/OR URETHANE GROUPS AND PROCESS FOR PREPARING SAME

A new process for the production of polymers which contain polyamide, urea and/or urethane groups has been found which is based on a polyaddition reaction of aliphatic or aromatic polyisocyanates with polyfunctional aminocrotonic acid esters, the substituents of which on the nitrogen containing additional hydroxyl or amino groups. The main feature of this invention is that the addition of the NCO group takes place simultaneously or successively on the hydroxyl or amino group, and always on the active hydrogen atom of the $$\diagdown_{/}C=CH$$

group of the aminocrotonic acid ester. Although the nitrogen function in the aminocrotonic acid ester catalyses the NCO addition to a not inconsiderable extent, it itself surprisingly does not enter into he reaction. The resulting polymers containing polyamide, urea and/or urethane groups still contain reactive double bonds which may be important for addition or polymerization reactions.

Accordingly, it is an object of this invention to provide high molecular weight polymers with a molecular weight of from 500 to 100,000 containing polyamide, urea and/or urethane groups consisting of recurring structural elements of the general formula $$A-O-CO-C-CO-NH-B$$
$$\quad\quad\quad\quad\;\;\|$$
$$\quad\quad\quad\quad\;\;C$$
$$\quad\quad\;CH_3 \;\; NH-R-X-CO-NH-B$$

in which
- A represents the polyfunctional radical of a polyol without the OH groups, and
- B represents the polyfunctional radical of an organic polyisocyanate without the NCO groups,
- R represents a radical selected from the groups consisting of an alkylene, a cycloalkylene, an aralkylene and an arylene radical, and
- X represents an —O— or an —NH— linkage.

It is a further object of this invention to provide a process for the production of cross-linked high molecular weight polymers containing polyamide, urea and/or urethane groups, which comprises reacting a polyfunctional aminocrotonic acid ester of the general formula:

$$\left[\begin{array}{c} \quad\quad\;\;H \\ CH_3-C=C-CO-O- \\ \quad\;\;|\\ \quad\;H-N-R \end{array}\right]_n A$$

in which
- R represents a radical selected from the group consisting of an alkyl, a cycloalkyl, an aralkyl and an aryl radical, said radicals containing one or more hydroxyl or amino groups,
- A represents the radical of a polyol without the OH groups and having a functionality of n, and
- n represents an integer of from 2 to 6, with an organic polyisocyanate.

The polyamide structure can be recognized in the nuclear resonance spectrum. The signal of the hydrogen atom of a $$\diagdown_{/}C=CH$$

group of the polyfunctional aminocrotonic acid ester, originally situated at 5.0 ppm (10 percent solution in dimethyl sulphoxide), disappears after addition of a polyisocyanate. The attack on the isocyanate, therefore, always occurs at this active H atom of the $$\diagdown_{/}C=CH$$

group. In polyfunctional aminocrotonic acid esters and in polyamide polyurethanes and polyureas, the IR spectrum always shows a shift of the carbonyl band of the ester groups in the longwave region, indicating powerful hydrogen bond formation.

The starting materials for the preparation of the polyfunctional aminocrotonic acid esters are the polyfunctional acetoacetic acid esters which may be obtained by the addition of diketene to polyols according to the general equation:

$$A(OH)_n + nCH_2=C-O$$
$$\quad\quad\quad\quad\quad\quad\;\;|\quad\;|$$
$$\quad\quad\quad\quad\quad\;CH_2-C=O$$

$$\left[ CH_3-C-CH_2-CO-O- \right]_n A$$
$$\quad\quad\;\;\|$$
$$\quad\quad\;O$$

The following are suitable polyols of the formula $A(OH)_n$: ethylene glycol, propylene glycol, butylene glycol, 1,12-octadecanediol, diethylene glycol, triethylene glycol, tetraethylene glycol, glycerol, trimethylol propane, 1,2,4-butane triol, 1,2,6-hexane triol, xylylene glycol, β-hydroxyalkyl ethers of polyphenols and polyalcohol esters of castor oil. The following hydroxypolyethers should also be mentioned: suitable hydroxy polyethers are linear or branched polyalkylene ether polyols which have molecular weights of from 500 to 3,000 and which may be prepared e.g. by polyaddition reactions of 1,2-alkylene oxides in ethylene oxide, propylene oxide, 1,2- and 2,3-butylene oxide, epichlorohydrin, styrene oxide or cyclohexene oxide, either alone or in admixture with each other, with itself or with low molecular weight starting molecules such as water, glycols such as hexanediol-(1,6) or 1,3-butylene glycol, polyols such as trimethylol propane, glycerol, pentaerythritol or sorbitol, or mono- and/or oligosaccharides such as cane sugar, glucose, lactose or degraded starches. Further suitable hydroxy polyethers are polytetrahydrofuran polyethers or polyoxycyclobutane polyethers which have a molecular weight of from 500 to 3,000. The following are also suitable polyols: linear or branched polyalkylene ether polyols which contain tertiary nitrogen and which may be obtained from the 1,2-alkylene oxided mentioned above as examples, in the same way as neutral polyalkylene ether polyols by polyaddition reactions of amines or aminoalcohols. The starting components for the preparation of these basic polyalkylene ether polyols are preferably mono- or polyamines which contain aliphatic and/or secondary amino groups. Ammonia, alkylamines such as methylamine or ethylamine, diamines of the general formula:

$$H_2N-(CH_2)_n-NH_2$$

in which n is an integer of from 2 to 12, such as ethylene diamine, tetramethylene diamine or hexa-methylene diamine, and polyamines of the general formula:

$$H_2N-[CH_2-CH_2-NH]_n-CH_2-CH_2-NH_2$$

in which n is an integer of from 1 to 6, such as diethylene triamine or triethylene tetraamine are mentioned as examples. Piperazine and N,N'-bis-(β-aminoethyl)-piperazine should also be mentioned. The above mentioned polyalkylene ether polyols optionally containing tertiary amine nitrogen, or amino polyethers, may also be used together with other polyhydroxyl compounds which contain reactive hydrogen, e.g. polythioethers, polyacetals or polycarbonates which may be prepared by conventional processes and which may also contain urethane groups. Other higher molecular weight compounds such as mixed aliphatic-aromatic polyethers, which are obtained by the condensation of bis-chloromethyl derivatives of aromatic hydrocarbons with aliphatic polyols, copolymers which have terminal hydroxyl groups obtained from olefines, cyclic acetals or polyacetals, polycondensates of polyacids and polyalcohols, hydrolysed copolymers of ethylene and vinyl acetate or hydroxyalkyl methacrylates, polyallyl alcohol, copolymers of styrene and allyl alcohol, or polystyrene or polybutadiene containing terminal hydroxyl groups are also suitable for the process of the invention as compounds containing reactive hydrogen atoms.

Another known method of preparing polyfunctional acetoacetic acid esters is based on an ester interchange of acetoacetic acid methyl or ethyl esters with polyols.

The polyfunctional acetoacetic acid esters obtained in this way are subsequently converted into the corresponding polyfunctional aminocrotonic acid esters of the formula shown above by the reaction of aliphatic aminoalcohols and of diamines of different reactivity towards polyfunctional acetoacetic acid esters, e.g., those which contain primary and secondary or, alternatively, aliphatic and aromatic amino groups in the molecule in a known manner, water being formed in the reaction. Condensation takes place with the aliphatic primary amino group with or without the presence of a catalyst at temperatures of between 0° and 150° C, preferably from 60° to 120° C. It is frequently advantageous to carry out this reaction in the presence of a solvent which forms an azeotropic mixture with water at elevated temperatures and which is miscible to only a slight extent at room temperature. The compounds mainly used are hydrocarbons such as benzene or toluene or halogenated hydrocarbons such as chloroform or carbon tetrachloride. For the removal of the water of the reaction, one of the known water separators may advantageously be used. The catalysts used may be acids, e.g. hydrochloric acid, formic acid or glacial acetic acid, or other compounds such as iodine, cation exchangers or active aluminas. If condensation is carried out under the conditions indicated above, very high yields are obtained, the products being mobile or oily liquids or viscous, waxy or solid masses according to the choice of polyol or amine component.

The conversion of the polyfunctional acetoacetic acid esters into polyfunctional aminocrotonic acid esters which contain hydroxyl or amino groups can be achieved by the method already described using aminoalcohols or diamines.

The following compounds are mentioned as examples: 2-aminoethanol, N-(2-hydroxyethyl)-ethylene diamine, N-methyl-N-(3-aminopropyl)-ethanolamine, 1-amino-3-methyl-aminopropane, 3-amino-propanol-(1), 1-amino-propanol-(2), 4-amino-butanol-(2), 4-amino-butanol-(1), 2-amino-2-methyl-propanol-(1), 2-amino-2-methyl-propane diol-(1,3), 1-amino-6-methylamino-hexane, 3-amino-benzylamine, 3-methylamino-benzylamine or 4-amino-(2-amino)-ethyl-benzene.

The compounds preferably used for the reaction are 2-aminoethanol and 3-aminobenzylamine.

The polyfunctional aminoctoronic acid esters obtained by the method described above are starting materials for the process of the invention.

The following are examples of polyisocyanates suitable for the reaction according to the invention with these polyfunctional aminocrotonic acid esters: aliphatic polyisocyanates such as 1,4-diisocyanato-butane, 1,6-diisocyanato-hexane, m- and p-xylylene diisocyanate, dicyclohexylmethane-4,4'-diisocyanate and cyclohexane-1,3- and cyclohexane-1,4-diisocyanate; aromatic polyisocyanates such as 1-alkyl-2,4- and -2,6-diisocyanates e.g. toluylene-2,4- and toluylene-2,6-diisocyanate and any isomeric mixtures of these two isocyanates; phenyl-1,3- and phenyl-1,4-diisocyanate, diphenylmethane-4,4'-diisocyanate, naphthylene-1,5-diisocyanate, diphenyl ether-4,4'-diisocyanate, 2,2'-dimethyl-diphenylmethane-4,4'-diisocyanate and 2,2'-dimethyldiphenylmethane-4,4'-diisocyanate; polymethylene-polyphenyl polyisocyanate prepared by aniline formaldehyde condensation followed by phosgenation; toluene-2,4,6-triisocyanate and 4,4',4''-triphenylmethane triisocyanate. The above mentioned polyisocyanates may be used either alone or in admixture with each other. Dimeric polyisocyanates may also be used, e.g. 3,3'-diisocyanato-4,4'-dimethyl-diphenyl uretdione. Polyisocyanates prepared according to German Pat. No. 1,092,007 and polyisocyanates containing an isocyanurate structure obtained by polymerization of 2,4-or 2,6-diisocyanato-toluene may also be used for the invention. NCO adducts which contain two or more NCO groups and which have been prepared by reacting an excess of the above mentioned polyisocyanates with low molecular weight polyols such as ethylene glycol, propylene glycol, butylene glycol, trimethylol propane, hexane triol, glycerol and sorbitol or castor oil, or ethylene diamine or high molecular weight polyols such as hydroxyl polyethers or polyesters are also suitable.

Various methods may be used for carrying out the process according to the invention. In one preferred embodiment of the process, the polyfunctional aminocrotonic acid esters are used along with a polyisocyanate in a proportion of NCO to active hydrogen of ≅ 1, the quantity of isocyanate being determined by the molar ratio of OH and NH$_2$ groups and of the active

group of the polyaminocrotonic acid ester. This operation may be carried out with or without solvents. The following are examples of suitable solvents: ethyl acetate, chlorobenzene, dioxane, methylene chloride, chloroform, acetone, butyl acetate, glycol monomethyl ether acetate and tetrahydrofuran and aromatic and aliphatic hydrocarbons, including commercial mixtures.

The products of the process may be colorless powders which precipitate because of their insolubility in solvents, or may be higher molecular weight materials which with suitable choice of solvents and starting materials, remain in colorless solution. A transparent, elastic or hard film remains after removal of the solvent by evaporation. Even though the nitrogen functions of the polyfunctional aminocrotonic acid esters considerably accelerate the reaction of the NCO groups with the active hydrogen atoms, it is still advisable, particularly in the case of high molecular weight linear starting materials, to accelerate the reaction by using additional catalysts such as organotin compounds, for example tin (II) ethyl hexoate, or other known activators such as tertiary amines, e.g. diazabicyclooctane or permethylated diethylene triamine. The use of catalysts is, of course, always advisable when low temperatures are employed. It is often advisable also to heat the reaction mixtures in the moulds at from 80 to 100°C for a short time, in order to ensure complete conversion in the shortest possible time. The products obtained by the process are hard, plastic, flexible or rubbery elastic materials, which are often no longer soluble in conventional solvents, depending on the choice of starting components.

According to another embodiment of the process, the polyfunctional aminocrotonic acid esters are reacted with a polyisocyanate in the ratio of NCO to active hydrogen of > 1, preferably 2. This may be carried out in the presence of or in the absence of solvents. Hardening of isocyanate-containing polyurethanes or polyureas, which in addition contain polyamide groups, is then achieved by means of the usual cross-linking agents used in isocyanate chemistry, e.g. water or polyols which may also contain hetero atoms such as tertiary nitrogen atoms, aminoalcohols, polyamines or dicarboxylic acid hydrazides. When water is to be used, the moisture from the atmosphere is sufficient. It converts a thin layer of the products of the process into an insoluble film in the course of a few hours. The products of the process are, therefore, suitable for use as one-component lacquers which harden in atmospheric moisture. Hardening of the products already proceeds at room temperature, but shorter setting times are, of course, obtained at higher temperatures. The catalysts used for hardening in atmospheric moisture may be e.g. tertiary amines or metal compounds which are soluble in organic solvents. The products are particularly suitable for the production of sheets on supports, e.g. lacquers, adhesives, laminates or coatings.

According to another embodiment of the process, the polyfunctional aminocrotonic acid esters may be reacted in admixture with other compounds which contain reactive hydrogen. The following are examples of compounds which still contain reactive hydrogen: polyethers which have been prepared under alkaline or acid conditions by the addition polymerization of one or more alkylene oxides with one or more polyols or amines by known processes as described e.g. in "High Polymers," Vol. XIII, "Polyethers," Part 1 (1963) by Norman G. Gaylord, published by Interscience Publishers. The molecular weight of the polyether may vary according to the purpose of use. It is generally in the region of from 300 to 3,000 and preferably between about 400 and 2,000.

Other suitable polyesters are, for example, the reaction products prepared by known methods of one or more polyols such as ethylene glycol, diethylene glycol, butylene glycol, glycerol or hexanetriol with one or more polycarboxylic acids such as oxalic acid, succinic acid, adipic acid, pimelic acid, maleic acid, phthalic acid or terephthalic acid. The molecular weight of the polyester may vary according to the purpose of use and is generally in the region of from about 300 to 3,000 and preferably between about 400 and 2,000.

The hydroxyl-containing polyfunctional aminocrotonic acid esters, which compared with the polyalkylene glycols are highly reactive, may also advantageously be used for the production of foam resins. In this case, the polyfunctional aminocrotonic acid esters, either alone or with other compounds which contain reactive hydrogen, are reacted with the corresponding quantity of polyisocyanate, in the presence of water or other blowing agents, catalysts, emulsifiers, stabilizers pore regulating agents or other additives. When water is used, the reaction of isocyanate with water so as to produce carbon dioxide as a blowing gas is only slightly catalysed by the polyfunctional aminocrotonic acid esters, but the formation of polyurethane with molecular linking is catalysed by the esters to a much greater extent. The synchronous progress of the two reactions can easily be attained by the addition of small amounts of tertiary amines such as diazabicyclooctane or permethylated polyamines.

The polyamide-polyurethane foams prepared by the method mentioned above are soft, elastic or semi-hard, depending on the choice of starting materials.

Polyamide-polyurethane foams can also be prepared by the so-called two-stage process, in which polyfunctional aminocrotonic acid esters are first converted into isocyanate-containing prepolymers by reaction with excess polyisocyanate, and the polyamide-polyurethane foams are then produced from these prepolymers in a separate stage by reaction with water, catalysts and auxiliary agents. This method often affords technical advantages in the so-called foaming in the mould process. When using polyfunctional aminocrotonic acid esters based on polyols which contain tertiary nitrogen, the use of additional tertiary amine and catalyst may sometimes be omitted in the subsequent foaming of the isocyanate-containing prepolymers prepared from them. The polyamide-polyurethane foams prepared by the method described are elastic and characterized by their high tensile strength.

Furthermore, plastics can be produced from the polyfunctional aminocrotonic acid esters by reaction with polyisocyanates, optionally with additional cross-linking agents. These plastics may be used as moulded articles, pourable sealing compounds or rubbery elastic products, or if desired, in solution as coating compounds or paints

PREPARATION OF THE STARTING MATERIALS

The polyols used for preparing the polyfunctional aminocrotonic acid esters are shown in the Table below (column 1). The reaction with diketene to produce the polyfunctional acetoacetic acid esters of the required viscosity, the choice of amines and physical properties of the aminocrotonic acid esters are shown in columns 2, 3 and 4.

POLYOLS

1. Ethylene glycol
2. Trimethylol propane
3. Glycerol
4. Butanetriol-(1,2,4)
5. Triethylene glycol
6. Tripropylene glycol
7. Linear polyethers, OH number = 56; molecular weight = 2,000
8. Partly branched polyethers, OH number = 56; molecular weight = 2,500
9. Branched polyethers, OH number = 56; molecular weight = 3,000
10. Branched polyethers, OH number = 35; molecular weight = 4,800.

| | Polyol | Acetoacetic acid ester viscosity (Cp. $^{25°}$) | Amine | Aminocrotonic acid ester viscosity (Cp. $^{25°}$) |
|---|---|---|---|---|
| A | 1 | 22 | N-(2-hydroxyethyl) ethylene diamine | (1) |
| B | 2 | | 2-aminoethanol | (1) |
| C | 2 | | 3-aminobenzylamine | (1) |
| D | 3 | | 2-aminoethanol | (1) |
| E | 4 | | do | (1) |
| F | 5 | 34 | 3-aminobenzylamine | (1) |
| G | 6 | 36 | do | (1) |
| H | 6 | 36 | 2-aminoethanol | (1) |
| I | 7 | 360 | do | 1,070 |
| J | 7 | 360 | 3-aminobenzylamine | 3,000 |
| K | 8 | 450 | 2-aminoethanol | 1,580 |
| L | 9 | 540 | do | 1,120 |
| M | 9 | 540 | 3-aminopropanol | 1,230 |
| N | 9 | 540 | 3-aminobenzylamine | 5,500 |
| O | 9 | 540 | N-(3-aminopropyl)-diethanolamine | 3,600 |
| P | 10 | 870 | 2-aminoethanol | 2,050 |
| Q | 10 | 870 | 3-aminobenzylamine | 4,150 |

[1] Viscous oil.

The preparation of the polyfunctional aminocrotonic acid esters is explained below with the aid of two examples.

A. 110 g (1.3 mol) of diketene are slowly added dropwise at from 50° to 60° C to 2,000 g of a branched polyether (10) of OH number 35 after the addition of 1.0 g of permethylated diethylene triamine or 1.5 g of triethylamine. When all the diketene has been added, stirring is continued until the reaction mixture is cold, and excess diketene is evaporated off in vacuo. The reaction mixture is dissolved in from 100 to 1,200 ml of benzene and 78 g (1.28 mol) of ethanolamine are added. The reaction mixture is then heated to boiling with a water separator attached to the reaction vessel. From 22.0 to 22.5 g of water have been separated after from 4 to 5 hours (theoretical amount = 23.0 g). The benzene is then distilled off in vacuo, whereupon the OH-containing polyfunctional aminocrotonic acid ester is obtained as a yellowish liquid which has a viscosity of 1,900 to 2,050 cP$_{25°}$.

B. When the polyfunctional acetoacetic ester prepared by the method described above is reacted in solution in benzene with 156 g (1.28 mol) of 3-aminobenzylamine, 22.0 g of water are separated in the course of about 3 hours when the reaction mixture is heated to from 80° to 90° C. After removal of benzene by evaporation, the NH$_2$-containing poly-functional aminocrotonic acid ester is obtained as a yellow oil which has a viscosity of about 4000 cP$_{25°}$.

The following examples are to further illustrate the invention without limiting it.

EXAMPLE 1

A. 50 g of the trifunctional aminocrotonic acid ester D are dissolved in a mixture of 80 g of dimethyl formamide and 20 g of methyl ethyl ketone. 29.5 g (NCO/reactive hydrogen = 0.5) of an isomeric mixture of 80 percent by weight of 2,4- and 20 percent by weight of 2,6-diisocyanato-toluene are then added and the reaction mixture is slightly cooled. When the reaction has subsided, a viscous liquid solution is obtained. The still slightly sticky film remaining after removal of the solvent by evaporation is still soluble in solvents such as tetrahydrofuran or dimethyl formamide.

B. If a mixture of 50 g of the trifunctional aminocrotonic acid ester D in 80 g of dimethyl formamide and 20 g of methyl ethyl ketone is stirred up with 49 g (NCO/reactive hydrogen = 1) of an isomeric mixture of 80 percent by weight of 2,4- and 20 percent by weight of 2,6-diisocyanato-toluene, high grade cross-linking takes place in a vigorous exothermic reaction which soon manifests itself in that the reaction mixture is converted into a jelly.

EXAMPLE 2

A. 50 g of the bifunctional aminocrotonic acid ester H and 122 g of a polyisocyanate (NCO = 31 percent) described in German Pat. No, 1,092,007 are rapidly mixed. A vigorous exothermic reaction sets in after about 2 minutes and the mixture solidifies after 5 minutes into a hard, glassy product which breaks only after being subjected to very severe bending stress.

B. If polyaddition is carried out with 78 g of an isomeric mixture of 65 percent by weight of 2,4- and 35 percent by weight of 2,6-diisocyanato-toluene, and if the mixture is not cooled during the reaction, a foamy, brittle polyamide polyurethane, which is no longer soluble in conventional solvents, is obtained after about 15 minutes.

EXAMPLE 3

200 g of the bifunctional aminocrotonic acid ester I and 34 g of naphthylene-1,5-diisocyanate are rapidly mixed at a temperature of about 80° C. The reaction mixture is left to cool to room temperature. After this time, a rubbery elastic material of high tensile strength which is free from bubbles is obtained. The insolubility in organic solvents indicates high grade polyaddition.

EXAMPLE 4

30.5 g of diphenylmethane-4,4'-diisocyanate are rapidly added to a mixture of 100 g of the polyfunctional aminocrotonic acid ester K and 3 g of butanediol-(1,4) at 80° C. and the reaction mixture is poured into a mould. After 15 minutes heating at 80° C, a transparent elastic product is obtained.

EXAMPLE 5

A similar rubbery elastic but softer product than that described in Example 3 is obtained by stirring 18 g of 1,6-diisocyanato-hexane in 200 g of the polyfunctional aminocrotonic acid ester Q followed by heating at 80° C. The resulting polyamide polyurea is insoluble in all solvents.

EXAMPLE 6

A mixture of 200 g of the polyfunctional amino-crotonic acid ester P and 18.6 g of 2,4-diisocyanato toluene also yield under the conditions mentioned in Example 5 a highly cross-linked polyamide polyurethane.

EXAMPLE 7

A solution of 100 g of the polyfunctional aminocrotonic acid ester M, 40 g of glycol monomethyl ether acetate, 10 g of toluene and 0.2 g of stannous ethyl hexoate is stirred together with 15.5 g of an isomeric mixture of 80 percent by weight of 2,4- and 20 percent by weight of 2,6-diisocyanato-toluene. After application of the solution as a thin layer on to a support and gradual evaporation of the solvent, an elastic lacquer coating is obtained, which has a non-sticky surface, after about 4 hours.

EXAMPLE 8

155 g of 2,4-diisocyanato-toluene (NCO/reactive hydrogen = 2) are added with stirring to 500 g of the bifunctional aminocrotonic acid ester J at room temperature, the temperature gradually rising to 50° C in the course of the next one-half hour. The addition reaction ends after about 2 hours stirring. The NCO content of the reaction mixture is now 6.2 percent.

a. If the resulting addition product having the NCO value indicated above is applied as a thin layer on to a glass plate, a transparent film which is no longer soluble in organic solvents is obtained after about 10 hours' storage at relative humidity of from 50 to 60 percent.

b. 200 g of the NCO-containing polyamide polyurethane described above are stirred together with 13.2 g of butanediol-(1,4). A softer but completely cross-linked product is obtained after about 10 hours.

EXAMPLE 9

The following reactants (A and B) are mixed using a high speed stirrer:

A. 100 g of the polyfunctional aminocrotonic acid ester K,
   0.5 g of 1,4-diazo-(2,2,2)-bicyclooctane,
   0.05 g of tin-(II) ethyl hexoate,
   0.1 g of an organosiloxane-alkylene oxide block polymer,
   0.3 g of water.

B. 45 g of an isomeric mixture of 65 percent by weight of 2,4-and 35 percent by weight of 2,6-diisocyanato-toluene.

The mixture of the components indicated above immediately starts to foam, and after about 60 seconds, it forms an elastic polyamide-polyurethane foam which differs from a polyurethane foam in its higher compression resistance. The bulk density is about 40 kg/m³.

EXAMPLE 10

The following components A and B are combined:

A. 50 g of a branched polyether, OH number = 35, molecular weight = 4,800 (10),
   50 g of the polyfunctional aminocrotonic acid ester Q,
   0.3 g of permethylated diethylene triamine,
   0.05 g of tin-(II) ethyl hexoate,
   3.0 g of water.

B. 38.0 g of an isomeric mixture of 65 percent by weight of 2,4 -and 35% by weight of 2,6-dissocyanato-toluene.

After an expanding time of about 70 seconds, a polyamide-polyurea foam with slightly closed pores is obtained. The bulk density is about 40 kg/m³.

EXAMPLE 11

100 g of a prepolymer of NCO content 10.5 percent prepared from 100 g of the bifunctional aminocrotonic acid ester I and 50 g of an isomeric mixture of 80 percent by weight of 2,4- and 20 percent by weight of 2,6-diisocyanato-toluene are intimately stirred together with 0.1 g of an organosiloxane alkylene oxide block polymer. A mixture of 2 g of water, 0.5 g of oleic acid diethylamine and 5 g of N-ethyl morpholine is then added. After an expanding time of about 120 seconds, a foam is obtained which tends to shrink because of its closed cell structure and must, therefore, be forced out under pressure.

What we claim is:

1. A polymer with a molecular weight of from 500 to 100,000 containing polyamide, urea and/or urethane groups consisting of the recurring structural elements of the general formula

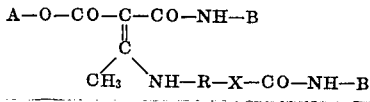

in which
- A represents the polyfunctional radical of a polyol without the OH groups, and
- B represents the polyfunctional radical of an organic polyisocyanate without the NCO groups.
- R represents a radical selected from the group consisting of an alkylene, a cycloalkylene, an aralkylene and an arylene radical, and
- X represents an —O— or an —NH— linkage.

2. A process for the preparation of polymers with a molecular weight of from 500 to 100,000 containing polyamide, urea and/or urethane groups, which comprises reacting a polyfunctional aminocrotonic acid ester of the general formula

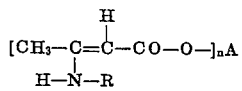

in which
- R represents a radical selected from the group consisting of an alkyl, a cycloalkyl, an aralkyl and an aryl radical said radicals containing one or more hydroxyl or amino groups,
- A represents the radical of a polyol without the OH groups and having a functionality of $n$, and
- $n$ represents an integer of from 2 to 6, with an organic polyisocyanate at a temperature of from 80° to 100° C.

3. The process of claim 2 in which the proportion of —NCO groups to active hydrogen atoms in said aminocrotonic acid ester is in the range of 1 to 2.

4. The process of claim 2 in which an additional compound containing active hydrogen atoms is present in the reaction.

5. The polymer of claim 1 in which A is a polyfunctional radical of a polyol selected from the group consisting of polyethers and polyesters having a molecular weight of 300 to 3,000 without the —OH groups.

6. The polymer of claim 1 in which A is the polyfunctional radical of a polyol comprising an organosiloxane-alkylene oxide block polymer, without the —OH groups.

7. The process of claim 2 in which A is a polyfunctional radical of a polyol selected from the group consisting of polyethers and polyesters having a molecular weight of 300 to 3,000, without the —OH groups.

8. The process of claim 2 in which A is the polyfunctional radical of a polyol comprising an organosiloxane-alkylene oxide block polymer, without the —OH groups.

* * * * *